United States Patent [19]
Cerutti et al.

[11] Patent Number: 5,512,235
[45] Date of Patent: Apr. 30, 1996

[54] SUPPORTED POLYCRYSTALLINE COMPACTS HAVING IMPROVED PHYSICAL PROPERTIES AND METHOD FOR MAKING SAME

[75] Inventors: David B. Cerutti; Henry S. Marek, both of Worthington, Ohio

[73] Assignee: General Electric Company, Worthington, Ohio

[21] Appl. No.: 239,156

[22] Filed: May 6, 1994

[51] Int. Cl.⁶ .................... B22F 3/14; B22F 7/02
[52] U.S. Cl. .................. 419/10; 419/14; 419/48; 419/51; 428/552; 75/236
[58] Field of Search .................. 419/10, 14, 48, 419/51; 428/552; 75/236

[56] References Cited

U.S. PATENT DOCUMENTS

| | | | |
|---|---|---|---|
| Re. 32,380 | 4/1987 | Wentorf, Jr. et al. | 407/119 |
| 2,941,241 | 6/1960 | Strong | 18/16.5 |
| 2,941,248 | 6/1960 | Hall | 18/16.5 |
| 2,947,611 | 8/1960 | Bundy | 23/209.1 |
| 2,947,617 | 8/1960 | Wentorf, Jr. | 51/307 |
| 3,030,662 | 4/1962 | Strong | 18/34 |
| 3,136,615 | 6/1964 | Bovenkerk et al. | 51/307 |
| 3,141,746 | 7/1964 | DeLai | 51/307 |
| 3,233,988 | 2/1966 | Wentorf, Jr. et al. | 51/307 |
| 3,609,818 | 10/1971 | Wentorf, Jr. | 18/34 R |
| 3,743,489 | 7/1973 | Wentorf et al. | 51/307 |
| 3,745,623 | 7/1973 | Wentorf, Jr. et al. | 29/95 B |
| 3,767,371 | 10/1973 | Wentorf, Jr. et al. | 51/307 |
| 3,831,428 | 8/1974 | Wentorf, Jr. et al. | 72/467 |
| 3,850,591 | 11/1974 | Wentorf, Jr. | 51/307 |
| 3,852,078 | 12/1974 | Wakatsuki et al. | 106/43 |
| 3,918,219 | 11/1975 | Wentorf, Jr. et al. | 51/307 |
| 4,188,194 | 2/1980 | Corrigan | 51/307 |
| 4,289,503 | 9/1981 | Corrigan | 51/307 |
| 4,334,928 | 6/1982 | Hara et al. | 75/238 |
| 4,394,170 | 7/1983 | Sawaoka et al. | 75/233 |
| 4,403,015 | 9/1983 | Nakai et al. | 428/565 |
| 4,673,414 | 6/1987 | Lavens et al. | 51/293 |
| 4,714,385 | 12/1987 | Komanduri | 407/119 |
| 4,778,486 | 10/1988 | Csillag et al. | 51/309 |
| 4,797,326 | 1/1989 | Csillag | 428/552 |
| 4,954,139 | 9/1990 | Cerutti | 51/293 |
| 5,106,792 | 4/1992 | Corrigan | 501/96 |
| 5,326,380 | 7/1994 | Yao et al. | 51/293 |

Primary Examiner—Donald P. Walsh
Assistant Examiner—Scott T. Bluni

[57] ABSTRACT

Supported polycrystalline compacts having improved shear strength, impact, and fracture toughness properties, and methods for making the same under high temperature/high pressure (HT/HP) processing conditions. The method involves a HT/HP apparatus formed of a generally cylindrical reaction cell assembly having an inner chamber of predefined axial and radial extents and containing pressure transmitting medium, and a charge assembly having axial and radial surfaces and formed of at least one sub-assembly comprising a mass of crystalline particles adjacent a metal carbide support layer. The charge assembly is disposed within the chamber of the reaction cell assembly, with the pressure transmitting medium being interposed between the axial and radial surfaces of the charge assembly and the extents of the reaction cell chamber to define an axial pressure transmitting medium thickness, $L_h$, and a radial pressure transmitting medium thickness, $L_r$, the ratio of which, $L_h/L_r$, being selected as less than 1. The reaction cell assembly containing the charge assembly then is subjected to HT/HP conditions selected as effective to sinter the crystalline particles into a polycrystalline compact layer and to bond the polycrystalline compact layer at an interface to the metal carbide support layer for forming a metal carbide supported polycrystalline compact. The supported compact is characterized as having an essentially constant or increasing residual compressive stress on the surface of its compact layer as portions of a predefined thickness, W, of its support layer, as measured from the interfaced, are incrementally removed.

18 Claims, 5 Drawing Sheets

SUPPORTED POLYCRYSTALLINE COMPACTS HAVING IMPROVED PHYSICAL PROPERTIES AND METHOD FOR MAKING SAME

BACKGROUND OF THE INVENTION

The present invention relates to polycrystalline diamond and cubic boron nitride (CBN) compacts made under high temperature/high pressure (HT/HP) processing conditions, and more particularly to supported HT/HP polycrystalline compacts having improved fracture toughness, abrasion resistance, and shear strength properties wherein a polycrystalline diamond or CBN layer is supported in a laminate arrangement on a metal carbide substrate.

A compact may be characterized generally as an integrally-bonded structure formed of a sintered, polycrystalline mass of abrasive particles, such as diamond or CBN. For many applications, however, it is preferred that the compact is supported by its bonding to substrate material to form a laminate or supported compact arrangement. Typically, the substrate material is provided as a cemented metal carbide which comprises, for example, tungsten, titanium, or tantalum carbide particles, or a mixture thereof, which are bonded together with a binder of about 6% to about 25% by weight of a metal such as cobalt, nickel, or iron, or a mixture or alloy thereof. As is shown, for example, in U.S. Pat. Nos. 3,381,428; 3,852,078; and 3,876,751, compacts and supported compacts have found acceptance in a variety of applications as parts or blanks for cutting and dressing tools, as drill bits, and as wear parts or surfaces.

The basic method for manufacturing the polycrystalline compacts and supported compacts of the type described herein involves the placing of an unsintered mass of abrasive, crystalline particles, such as diamond or CBN, or a mixture thereof, within a protectively shielded metal enclosure which is disposed within the reaction cell of a HT/HP apparatus of a type described further in U.S. Pat. Nos. 2,947,611; 2,941,241; 2,941,248; 3,609,818; 3,767,371; 4,289,503; 4,673,414; and 4,954,139, the disclosures of which are expressly incorporated herein by reference. Additionally placed in the enclosure with the abrasive particles may be a metal catalyst if the sintering of diamond particles is contemplated, as well as a pre-formed mass of a cemented metal carbide for supporting the abrasive particles and thereby form a supported compact therewith. The contents of the cell then are subjected to processing conditions selected as sufficient to effect intercrystalline bonding between adjacent grains of the abrasive particles and, optionally, the joining of the sintered particles to the cemented metal carbide support. Such processing conditions generally involve the imposition for about 3 to 120 minutes of a temperature of at least 1300° C. and a pressure of at least 20 kbar.

As to the sintering of polycrystalline diamond compacts or supported compacts, the catalyst metal may be provided in a pre-consolidated form disposed adjacent the crystal particles. For example, the metal catalyst may be configured as an annulus into which is received a cylinder of abrasive crystal particles, or as a disc which is disposed above or below the crystalline mass. Alternatively, the metal catalyst, or solvent as it is also known, may be provided in a powdered form and intermixed with the abrasive crystalline particles, or as a cemented metal carbide or carbide molding powder which may be cold pressed in to shape and wherein the cementing agent is provided as a catalyst or solvent for diamond recrystallization or growth. Typically, the metal catalyst or solvent is selected from cobalt, iron, or nickel, or an alloy or mixture thereof, but other metals such as ruthenium, rhodium, palladium, chromium, manganese, tantalum, and alloys and mixtures thereof also may be employed.

Under the specified HT/HP conditions, the metal catalyst, in whatever form provided, is caused to penetrate or "sweep" into the abrasive layer by means of either diffusion or capillary action, and is thereby made available as a catalyst or solvent for recrystallization or crystal intergrowth. The HT/HP conditions, which operate in the diamond stable thermodynamic region above the equilibrium between diamond and graphite phases, effect a compaction of the abrasive crystal particles which is characterized by intercrystalline diamond-to-diamond bonding wherein parts of each crystalline lattice are shared between adjacent crystal grains. Preferably, the diamond concentration in the compact or in the abrasive table of the supported compact is at least about 70% by volume. Methods for making diamond compacts and supported compacts are more fully described in U.S. Pat. Nos. 3,141,746; 3,745,623; 3,609,818; 3,850,591; 4,394,170; 4,403,015; 4,797,326; and 4,954,139, the disclosures of which are expressly incorporated herein by reference.

As to polycrystalline CBN compacts and supported compacts, such compacts and supported compacts are manufactured in general accordance with the methods suitable for diamond compacts. However, in the formation of a CBN compacts via the previously described "sweep-through" method, the metal which is swept through the crystalline mass need not necessarily be a catalyst or solvent for CBN recrystallization. Accordingly, a polycrystalline mass of CBN may be joined to a cobalt-cemented tungsten carbide substrate by the sweep through of the cobalt from the substrate and into the interstices of the crystalline mass notwithstanding that cobalt is not a catalyst or solvent for the recrystallization of CBN. Rather, the interstitial cobalt functions as a binder between the polycrystalline CBN compact and the cemented tungsten carbide substrate.

As it was for diamond, the HT/HP sintering process for CBN is effected under conditions in which CBN is the thermodynamically stable phase. It is speculated that under these conditions, intercrystalline bonding between adjacent crystal grains also is effected. The CBN concentration in the compact or in the abrasive table of the supported compact, again, is preferably at least about 50% by volume. Methods for making CBN compacts and supported compacts are more fully described in U.S. Pat. Nos. 2,947,617; 3,136,615; 3,233,988; 3,743,489; 3,745,623; 3,767,371; 3,831,428; 3,918,219; 4,188,194; 4,289,503; 4,334,928; 4,673,414; 4,797,326; and 4,954,139, the disclosures of which are expressly incorporated herein by reference.

As is described in U.S. Pat. No. 4,334,928, yet another form of a polycrystalline compact, which form need not necessarily exhibit direct or intercrystalline bonding, involves a polycrystalline mass of diamond or CBN particles having a second phase of a metal or alloy, a ceramic, or a mixture thereof. The second material phase is seen to function as a bonding agent for the abrasive crystal particles. Polycrystalline diamond and polycrystalline CBN compacts containing a second phase of a cemented carbide material are exemplary of these so-called "conjoint" or "composite" polycrystalline abrasive compacts.

With respect to supported compacts, it is speculated, as is detailed in U.S. Pat. No. 4,797,326, that the bonding of the support to the polycrystalline abrasive mass involves a physical component in addition to a chemical component which develops at the bondline if the materials forming the respective layers are interactive. The physical component of bonding is seen to develop from the relatively lower CTE of the polycrystalline abrasive layer as compared to the cemented metal support layer. That is, upon the cooling of the supported compact blank from the HT/HP processing conditions to ambient conditions, it has been observed that the support layer retains residual tensile stresses which, in turn, exert a radial compressive loading on the polycrystalline compact supported thereon. This loading maintains the polycrystalline compact in compression which thereby improves fracture toughness, impact, and shear strength properties of the laminate.

In the commercial production of supported compacts, however, it is common for the product or blank which is recovered from the reaction cell of the HT/HP apparatus to be subjected to a variety or finishing operations which include cutting, such as by electrode discharge machining or with lasers, milling, and especially grinding to remove any adherent shield metal from the outer surfaces of the compact. Such finishing operations additionally are employed to machine the compact into a cylindrical shape or the like which meets product specifications as to diamond or CBN abrasive table thickness and/or carbide support thickness. Especially with respect to diamond and CBN supported compacts, a substantially uniform abrasive layer thickness is desirable since the abrasive tables on the blanks are often machined by the user into final products having somewhat elaborate configurations, e.g., sawtoothed wedges, which are tailored to fit particular applications. It will be appreciated, however, that during such finishing operations, the temperature of the blank, which previously has been exposed to a thermal cycle during its HT/HP processing and cooling to room temperature, can be elevated due to the thermal effects of grinding or cutting operations. Moreover, the blank or product finished therefrom may be mounted onto a variety of cutting or drilling tools using braze techniques which again subjects the compacts and supports to thermal gradients and stresses. During each of the thermal cyclings of the supported blank, the carbide support, owing to its relatively higher coefficient of thermal expansion (CTE), will have expanded to a greater extent than the abrasive compact supported thereon. Upon heating and cooling, the stresses generated are relieved principally through the deformation of the abrasive material which may result in stress cracking.

As the supported compacts heretofore known in the art have garnered wide acceptance for use in cutting and dressing tools, drill bits, and the like, it will be appreciated that any improvements in the strength and machining properties of such materials would be well-received by industry. Especially desired would be diamond and CBN supported compacts having improved fracture toughness, impact, and shear strengths which would expand the applications for such material by enhancing their machinability, performance, and wear properties. Thus, there has been and heretofore has remained a need for diamond and CBN supported compacts having improved physical properties.

BROAD STATEMENT OF THE INVENTION

The present invention is directed to polycrystalline diamond and cubic boron nitride (CBN) supported compacts and a method of making the same under high temperature/ high pressure (HT/HP) processing conditions, and more particularly to HT/HP polycrystalline supported compacts having improved shear strength, impact, and fracture toughness properties wherein a polycrystalline diamond or CBN layer is supported in a laminate arrangement on a metal carbide substrate. The method of the invention involves a HT/HP apparatus formed of an axisymmetric reaction cell assembly having an inner chamber of predefined axial and radial extents and containing pressure transmitting medium, and a charge assembly having axial and radial surfaces and formed of at least one sub-assembly comprising a mass of crystalline particles adjacent a metal carbide support layer. The charge assembly is disposed within the chamber of the reaction cell assembly, with the pressure transmitting medium being interposed between the axial and radial surfaces of the charge assembly and the extents of the reaction cell chamber to define an axial pressure transmitting medium thickness, $L_h$, and a radial pressure transmitting medium thickness, $L_r$. In accordance with the precepts of the present invention, the ratio $L_h/L_r$ is selected as being less than 1. The reaction cell assembly containing the charge assembly then is subjected to HT/HP conditions selected as effective to sinter the crystalline particles into a polycrystalline compact layer and to bond the polycrystalline compact layer at an interface to the metal carbide support layer for forming the metal carbide supported polycrystalline compact of the present invention. This supported compact is characterized as having essentially constant or increasing principal residual compressive stresses on the surface of its compact layer as portions of a predefined thickness, W, of its support layer, as measured from the interface, are incrementally removed.

Advantageously, the supported compacts of the present invention exhibit improved performance properties, such as fracture toughness, abrasion resistance, and shear strength, as compared to supported compacts wherein the residual surface stress on the compact layer is a tensile stress or a compressive stress which decreases as portions of a predefined thickness, W, of the support layer is incrementally removed. Additional advantages of the present invention include diamond or CBN supported compact blanks which may be made in conventional HT/HP process apparatuses, but which have higher service temperatures and which may be machined or otherwise finished in conformance with product specifications without stress cracking or the like caused by the abrasive tables thereof being changed from a compressive into a tensile stress state. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

In the discourse to follow, the precepts of the present invention are illustrate in connection with a conventional HT/HP apparatus which may be of the belt- or die-type described, for example, in U.S. Pat. Nos. 2,947,611; 2,941,241; 2,941,248; 3,609,818; 3,767,371; 4,289,503; 4,673,414; and 4,954,139. However, it will be appreciated that the method of the invention will find applicability in any HT/HP apparatus of a general type which is capable of providing the required HT/HP conditions. Accordingly, it is intended that such other HT/HP apparatuses are within the scope of the invention herein described.

Figure 1:
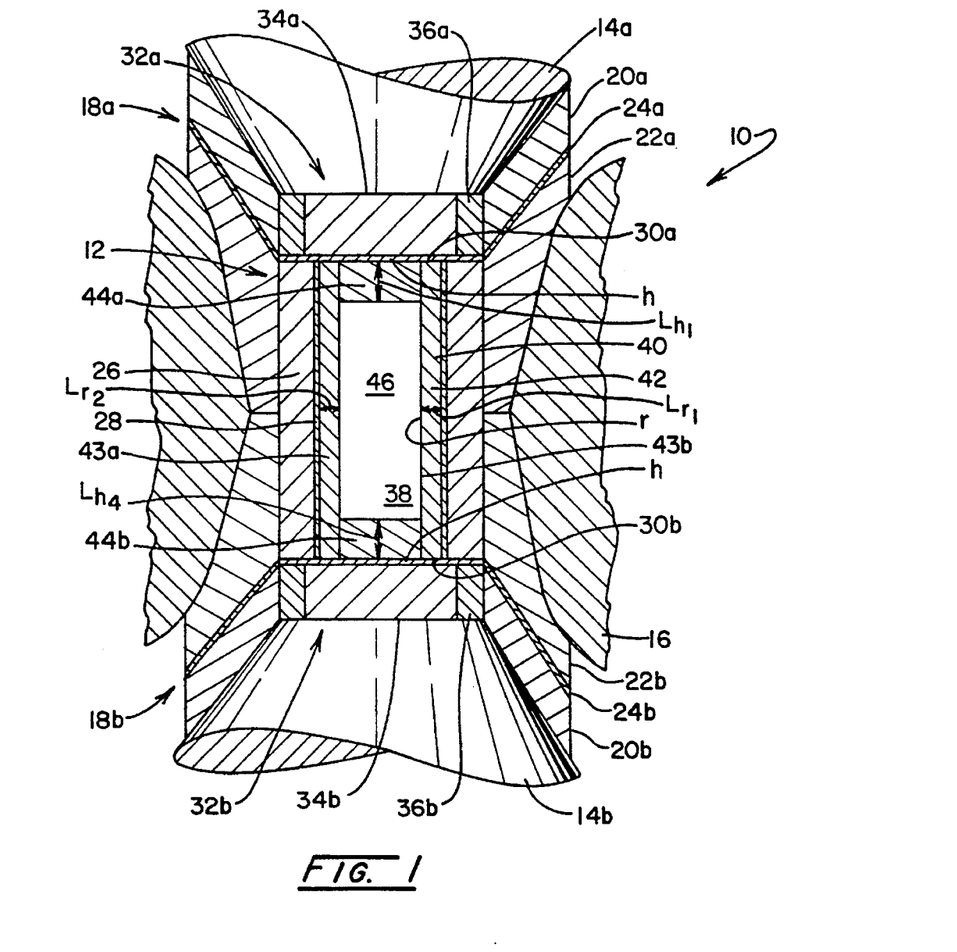
FIG. 1 is a cross-sectional view of a conventional HT/HP apparatus which may be utilized to prepare the supported compacts of the present invention.

Looking then to FIG. 1, an illustrative HT/HP apparatus useful in conjunction with the present invention is shown generally at 10 to comprise a generally cylindrical reaction cell assembly, 12, interposed between a pair of punches, 14a and 14b, and surrounded by a generally annular belt or die member, 16. Preferably, both punches 14 and belt member 16 are formed of a relatively hard material such as a cemented tungsten carbide. Between punches 14 and belt member 16 are a pair of insulating assemblies, 18a and 18b, each of which is formed of a pair of thermally- and electrically-insulating members, 20a–b and 22a–b, each preferably formed of pyrophyllite or the like and having an intermediate metallic gasket, 24a and 24b, disposed therebetween.

As shown, reaction cell assembly 12 includes a hollow cylinder, 26, which may be formed of a material such as salt or the like which is converted during HT/HP by phase transformation or compaction to a stronger, stiffer state, or, alternatively of a talc material or the like which is not so converted. In either case, the material of cylinder 12 is selected has being substantially free of volume discontinuities or the like under HT/HP as may occur, for example, with pryophyllite or alumina materials. Materials meeting such criteria are described in U.S. Pat. No. 3,030,662.

Positioned concentrically within salt cylinder 26 is an adjacent cylinder, 28, which is provided as a graphite electrical resistance heater tube. Electrical connection with heater tube 28 is achieved via an adjacent pair of conductive-metal end discs, 30a and 30b, which are axially-disposed with respect to heater tube 28. Adjacent each disc 30 is provided an end cap assembly, shown generally at 32a and 32b, each of which comprises an insulating plug, 34a and 34b, surrounded by an electrically conductive ring, 36a and 36b.

It will be appreciated that the interior of heater 28, along with end discs 30, salt cylinder 26, and end cap assemblies 32, defines a generally-cylindrical inner chamber, shown at 38, having defined axial and radial extents, h and r, respectively, and containing a pressure transmitting medium, 40. Pressure transmitting medium 40 is selected as having a relatively low coefficient of internal friction to make it semi-fluid at HT/HP conditions, and may be provided as a cylindrical salt liner, 42, which defines radial pressure transmitting medium layers 43a and 43b, and is fitted with an axial pair of salt plugs, 44a and 44b, each of which defines an axial pressure transmitting medium layer. Preferably, salt liner 42 and plugs 44 are formed of a sodium chloride, but also may be formed of any chloride, iodide, or bromide of sodium, potassium, or calcium, or a mixture thereof. Alternatively, pressure transmitting medium 40 may be provided in a powdered or particulate form. In either case, medium 40 defines a cavity space, as is shown at 46, which is configured to receive a charge assembly, 50, which is illustrated in a somewhat enhanced detail in FIG. 2.

Figure 2:
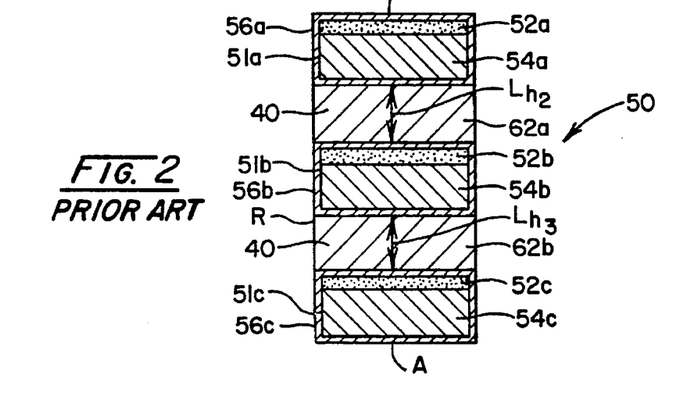
FIG. 2 shows in cross-section a charge assembly configured according to the prior art for use within the reaction cell of the HT/HP apparatus of FIG. 1.

Looking additionally to FIG. 2, a representative charge assembly 50 configured to be received in cavity space 46 of reaction cell 12 (FIG. 1) is shown to contain a number of sub-assemblies, 51a–c, provided in a stacked, axially-aligned arrangement for preparing a plurality of disc- or cylindrically-shaped supported compacts. Each sub-assembly 51 is shown to comprise a mass of crystalline diamond or CBN particles, 52a–c, which particles may range in diameter from less than a micron to greater than 100 microns, and which are supported on a pre-sintered layer of a cemented metal carbide, 54a–c. Carbide layers 54 may comprise, for example, tungsten, titanium, tantalum, or molybdenum carbide particles, or mixtures thereof, and a metal binder such as cobalt, nickel, or iron, or a mixture or alloy thereof. Although pre-sintered metal carbide layers 54 are preferred for setup convenience, layers of a sinterable carbide powder admixed with a powdered metal binder may be substituted. For masses 52a–c of diamond particles, the metal binder of the cemented metal carbide support layers 54a–c preferably is selected as being as diamond catalyst or solvent such as cobalt, iron, nickel, ruthenium, rhodium, palladium, platinum, chromium, manganese, tantalum, osmium, iridium, or a mixture or alloy thereof which, under HT/HP conditions, is made to advance or "sweep" by diffusion or capillary action through the dense crystalline masses 52. In this manner, the metal is thereby made available as a catalyst or solvent for recrystallization or crystal intergrowth of the diamond. Alternatively, the diamond catalyst or solvent may be admixed with the crystalline diamond particles of masses 52, or provided in separate layers placed adjacent masses 52 or interposed between masses 52 and carbide support layers 54.

Each of the sub-assemblies 51 of charge assembly 50 are contained in a shielded cylindrical sleeve, 56a–c, which preferably is formed of a refractory metal such as zirconium, titanium, tantalum, tungsten, or molybdenum, or, alternatively, of another refractory material such as mica, alumina, salt, or a mixture thereof. Between each of the sub-assemblies contained in shield sleeves 56 are interposed plugs or layers, 62a–b, of additional pressure transmitting medium 40, each of which defines an additional axial pressure transmitting medium layer. As charge assembly 50 is design as having a studied, mechanical instability, pressure transmitting layers 62 are selected as being semi-fluid under HT/HP conditions to accommodate for the reduction in volume of each sub-assembly 51 during processing.

After the disposition of charge assembly 50 into cavity 46 of reaction cell 12, heat from heater tube 28 and a generally axial pressure from punches 36 are applied to the contents of reaction cell 12 for a time sufficient to effect the sintering or intercrystalline bonding of particle masses 52 into integral abrasive bodies or polycrystalline compacts which are essentially free of voids, and the direct bonding of these compacts to their underlying cemented metal carbide supports 54. Advantageously, the direct bonding relationship between the compacts and their supports obviates any need for the interposition of a bonding layer therebetween, as would result from the brazing or soldering-of the compacts to the supports. Broadly, the HT/HP conditions under which apparatus 10 is operated are selected as being within the thermodynamic region wherein diamond or CBN is the stable phase and whereat significant reconversion, i.e., graphitization, of the crystalline diamond, or CBN particles does not occur. In this regard, for diamond, apparatus 10 is operated at a temperature of at least about a 1000° C., but preferably from between about 1000° C. to about 2000° C., and at a pressure of at least about 20 kbar, but preferably from between about 40 to about 80 kbars. These same HT/HP conditions generally hold for the processing of CBN as well, although it should be noted that the preferred temperatures and pressures specified herein are estimates only due to the difficulties attending the accurate and precise measurement of the high temperatures and pressures necessary for diamond or CBN processing. In addition, the pressure and temperature values specified need not remaining constant during processing, but may be varied to define predetermined heating, cooling, and/or pressure schedules. It is known that such variances may affect the ultimate physical properties of the product.

Figure 3:
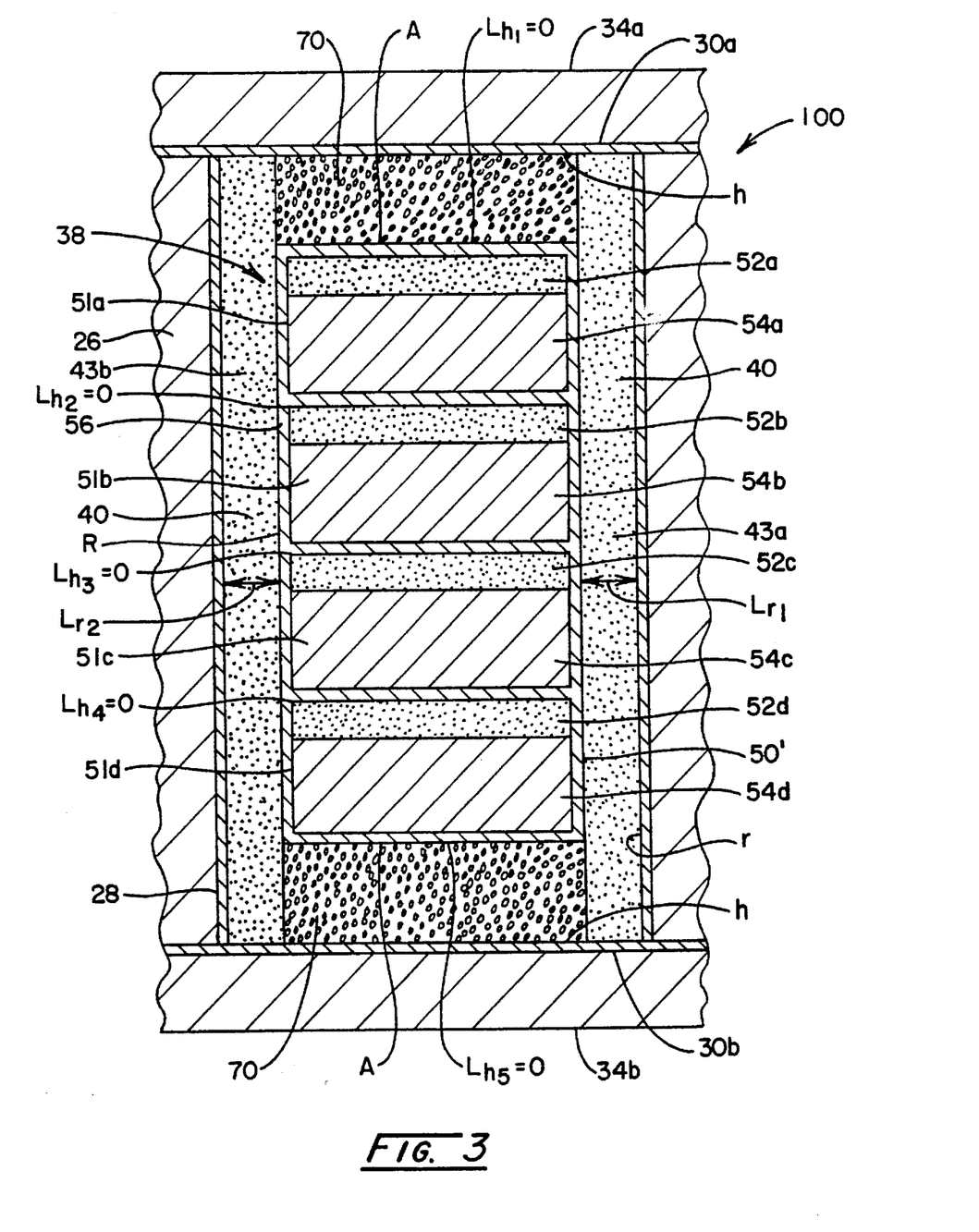
FIGS. 3 and 4 show cross-sectional views of representative reaction cell assemblies modified in accordance with the present invention to have ratios of axial pressure transmitting medium thickness, $L_h$, to radial pressure transmitting medium thickness, $L_r$, of less than 1.
Figure 4:
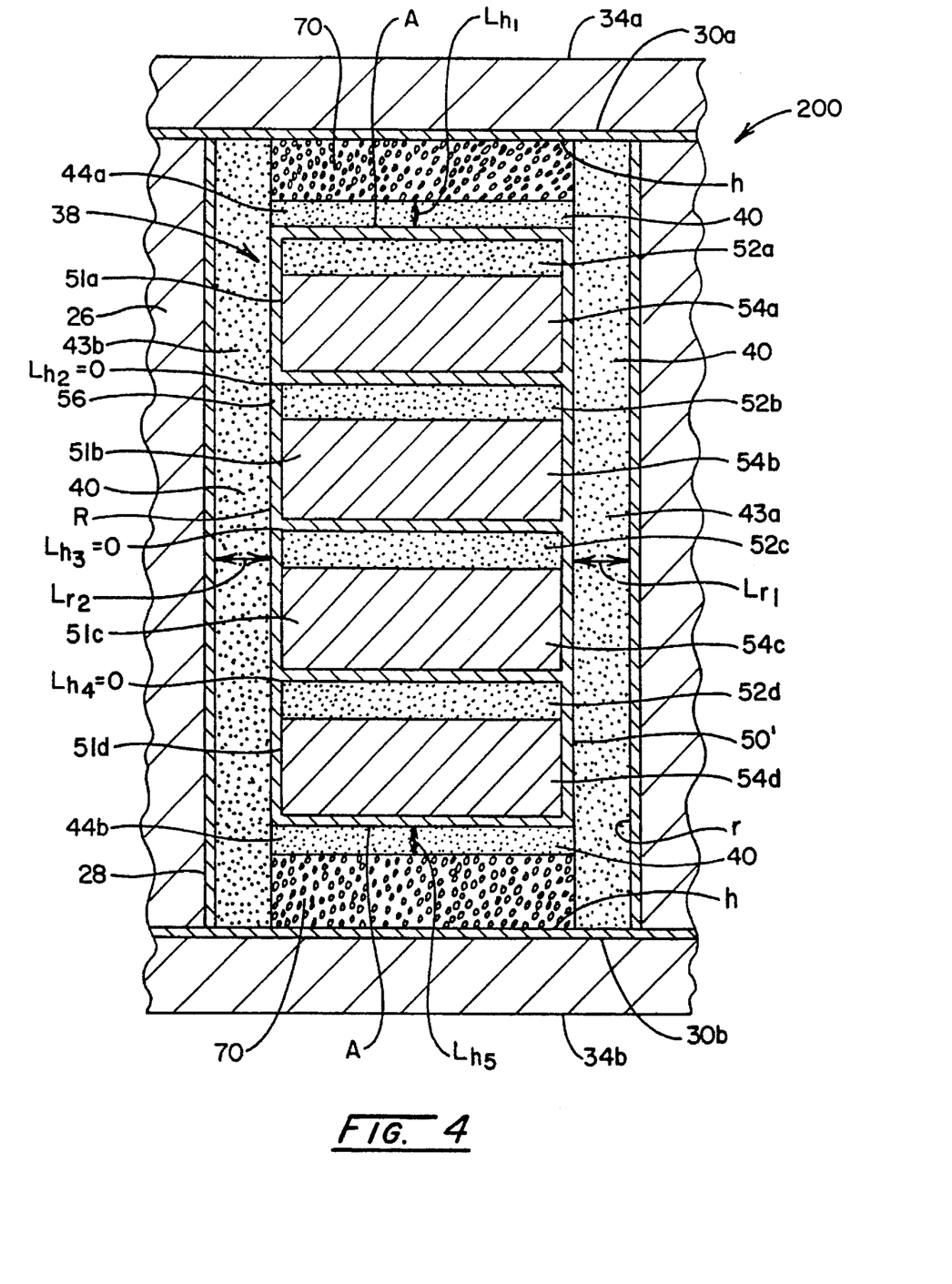

Considering additionally FIGS. 3 and 4, wherein elements common to FIGS. 1 and 2 are numbered correspondingly, the precepts of the present invention are shown in connection with reaction cell 10 of FIGS. 1 and 2, and with reaction cells 100 and 200 of FIGS. 3 and 4, respectively. Cells 10, 400, and 200 each are shown as having an inner chamber 38 defining axial and radial extents h and r. Into chamber 38 of cells 100 and 200 are disposed a charge assembly 50' which, for purposes of illustration, includes a number of sub-assemblies, 51a–d, each again comprising a crystalline mass, 52a–d, supported on a cemented metal carbide layer, 54a–d. Each charge assembly 50' is defined as having axial surfaces, A, and a radial surface, R, although such convention should not be interpreted as limiting charge assembly 50' to a generally cylindrical configuration as other axisymmetric configurations, such as polygons, are considered to be within the scope of the invention herein described.

Looking again to FIGS. 1 and 2, a conventional arrangement is illustrated wherein an axial pressure transmitting medium thickness, $L_h$, may be defined as the summation of the thicknesses, $L_{h1}$ and $L_{h4}$, of axial pressure transmitting medium layers 44a and 44b, and of the thicknesses, $L_{h2}$ and $L_{h3}$, of axial pressure transmitting medium layers 62a and 62b interposed between each sub-assembly 51. Similarly, a radial pressure transmitting medium thickness, $L_r$, may be defined as the summation of the thicknesses, $L_{r1}$ and $L_{r2}$, of the radial pressure transmitting medium layers 43a and 43b between the radial surface R of charge assembly 50 and the corresponding radial extent r of chamber 38. With thicknesses $L_h$ and $L_r$ being given as defined, a ratio, $L_h/L_r$, may be derived as relating to the pressure distribution on charge assembly 50 during its cooling under pressure from the high temperature conditions in the diamond-or CBN-stable region to a lower or an ambient temperature. With each $L_{h1}$, $L_{h2}$, $L_{h3}$, and $L_{h4}$, being about equal to each $L_{r1}$ to $L_{r2}$ as is shown, a generally isobaric pressure distribution is effected in total on assembly 50.

Looking next to FIG. 3, reaction cell 100 is shown to be modified in accordance with the precepts of the present invention. In this regard, pressure transmitting medium 40 is provided between the radial surface R of charge assembly 50' and the corresponding radial extent r of chamber 38 to define a radial pressure transmitting medium thickness $L_r$, which again is derived as the summation of the thicknesses $L_{r1}$ and $L_{r2}$ of the radial pressure transmitting medium layers 43a and 43b. As no axial layers 44a and 44b (FIG. 1) are provided between the axial surfaces A of charge assembly 50' and the axial extents h of chamber 38, i.e., $L_{h1}$ and $L_{h5}$ equal 0, and as no axial layers 62 (FIG. 2) are interposed between each sub-assembly 51, i.e., $L_{h2}$, $L_{h3}$, and $L_{h4}$ equal 0, the axial pressure transmitting medium thickness $L_h$, derived as the summation of thicknesses $L_{h1}$, $L_{h2}$, $L_{h3}$, $L_{h4}$ and $L_{h5}$ is given as being equal to 0. Thus, the ratio $L_h/L_r$ is given generally as being less than one, and, for the particular arrangement shown, as being equal to 0. It should be noted, however, that arrangements of pressure transmitting medium layers different from that specifically illustrated may be employed if the ratio $L_h/L_r$ is maintained to be less than 1. Accordingly, axial pressure transmitting layers 44 (FIG. 1) and 62 (FIG. 2) may be included so long as the summation of the thicknesses thereof, $L_h$, is less than the radial pressure transmitting medium thickness $L_r$.

The above-defined ratio of $L_h/L_r<1$ has been observed to effect a generally non-isobaric pressure distribution wherein, it is believed, stresses in the axial direction of charge assembly 50' are preferentially relieved during cooling to result in a predominantly radial compressive loading on the compact layer of the laminate. As will be detailed in the Examples to follow, the non-isobaric pressure distribution of the present invention has been observed to result in a supported compact having a preferred residual surface stress distribution pattern. This preferred residual stress distribution pattern further has been observed to favorably affect the physical properties of the supported compact in terms of improved shear and impact strengths, and fracture toughness.

For adapting the method of the present invention, wherein the ratio $L_h/L_r$ is adjusted to be less than 1, to a variety of charge configurations or to a variety of conventional HT/HP apparatuses 10 having chambers of varying dimensions, a non-pressure transmitting or filler medium, as is shown in FIG. 3 at 70, may be interposed between the axial surfaces A of cell assembly 50' and the corresponding axial extents h of chamber 38. Non-pressure transmitting medium 70 is provided to fill the portions of chamber 38 which conventionally would contain additional pressure transmitting medium 40. As used herein, non-pressure transmitting medium 70 is selected as having, as compared to pressure transmitting medium 40, a relatively higher coefficient of internal friction at the contemplated HT/HP conditions such that is semi-rigid rather than semi-fluid. In this regard, medium 70 may be provided as powdered graphite or, alternatively, as a powdered ceramic material such as alumina, magnesium oxide, or calcium oxide, or a powdered metal such as tungsten, molybdenum, or cobalt.

Turning next to FIG. 4, the precepts of the present invention are further illustrated in connection with reaction cell 200 wherein the ratio $L_h/L_r$ is shown to be greater than 0 but less than 1. In such configuration, pressure transmitting medium 40 again is provided between radial R surface of charge assembly 50' and the corresponding radial extent r of chamber 38 to define a radial pressure transmitting medium thickness $L_r$, which is derived as the summation of the thicknesses $L_{r1}$ and $L_{r2}$ of the radial pressure transmitting medium layers 43a and 43b. Pressure transmitting medium 40 also is provided between the axial surfaces A of charge assembly 50' and the corresponding axial extents h of chamber 38 to define an axial pressure transmitting medium thickness $L_h$, which is derived as the summation of the thicknesses, $L_{h1}$ and $L_{h5}$, of axial pressure transmitting medium layers 44a and 44b, and of the thicknesses, $L_{h2}$, $L_{h3}$, and $L_{h4}$ of axial pressure transmitting medium layers 62a and 62b (FIG. 2), which, for illustrative purposes, are shown to be equal to 0. To fill the remainder of chamber 38, non-pressure transmitting medium 70 is included between axial pressure transmitting medium layers 44a and 44b and the axial extents h of chamber 38. Such inclusion facilitates the varying of the relative values of $L_h$ from between 0, as is shown in FIG. 3, to less than $L_r$, as is shown in FIG. 4, in order to maintain the ratio $L_h/L_r$ of from between 0 and less than 1.

As will be shown in connection with the Examples to follow, a supported compact formed by the method illustrated in FIG. 4 will have a residual surface stress distribution pattern and physical properties intermediate those of the supported compacts formed as illustrated in FIGS. 2 and 3. Accordingly, an additional object of the present invention is to provide a capability for tailoring the physical properties of a supported compact by effecting a non-isobaric pressure distribution thereacross during its cooling.

The Examples to follow, wherein all percentages and proportions are by weight unless otherwise expressly indicated, are illustrative of the practicing of the invention herein involved, but should not be construed in any limiting sense.

EXAMPLES

EXAMPLE 1

Supported compact samples having a diameter of 50 mm were prepared using a crystalline CBN feedstock having an average particle size distribution of 2 microns, and a tungsten carbide-cobalt support comprising about 10–16% cobalt by weight. Samples of the supported feedstock were charged within the reaction cell of a conventional HT/HP apparatus, which cell was provided to contained a pressuring transmitting medium of a powdered NaCl salt which was interposed between the axial and radial extents of the cell and the axial and radial surfaces of the samples at varying ratios of $L_h/L_r$ as defined hereinbefore. If necessary, a powder graphite filler medium was interposed between the pressure transmitting medium and/or the surfaces of the charge, and the axial extents of the cell.

The samples prepared as described were processed at conventional HT/HP conditions including a temperature of about 1300° to 1600° C. and a pressure of about 50–60 kbars which were applied for about 60 minutes. A cool down cycled followed wherein the cooling rate was controlled to about 10°–20° C./sec and the pressure was relieved at a rate of about 10 kbar/min. The generally cylindrical supported blanks recovered were about 50 mm in diameter, and had an overall thickness of about 3.2 mm with a CBN layer thickness of about 0.5 to 0.8 mm and a carbide support layer thickness of about 2.4 to 2.7 mm.

The shear strengths of the supported compacts processed at the different $L_h/L_r$ ratios were obtained, and are summarized for purposes of comparison in Table 1. The results showed an increase in the shear strength range for the supported compacts processed in accordance with the procedure herein described, i.e., $L_h/L_r<1$, thus validating the precepts of the present invention.

TABLE 1

| | Shear Strength Range Comparison | | |
| --- | --- | --- | --- |
| Sample No. | $L_h/L_r$ | Density (g/cm³) | Shear Strength Range (KSI) |
| Control | 15/1 | 4.07 | 146–151 |
| Experimental 1 | 0/1 | 4.16 | 166–180 |

EXAMPLE 2

The Experimental and Control samples of Example 1 were characterized in terms of the principal residual stresses on the surface of the CBN layer. In this regard, a strain gauge (Measurements Group, Inc., triple rectangular stacked rosette, WA-03-03WR-120 gauges) was centered on the top or outer axial surface of the CBN layer of selected samples, and the carbide layers of the samples were machined to a normalized thickness, W, of about 0.1-inch (2.54 mm) as measured from the interface with the CBN layer. Principle orthogonal stress readings, $S_p$ and $S_q$, were obtained as increments of the carbide layers were removed down to a minimum thickness of 0.051 mm (0.002-inch) to affect the residual surface stress of the blank. The results for a representative Control and Experimental sample are presented in FIGS. 5 and 6, respectively, as a plot of the residual surface stress in the CBN layer versus carbide layer thickness. These results additionally are summarized in Table 2.

TABLE 2

| | Residual Surface Stress (RSS) Distribution Comparison | |
| --- | --- | --- |
| | Sample No. | |
| | Control ($L_h/L_r$ = 15/1) | Experimental 1 ($L_h/L_r$ = 0/1) |
| Compressive Peak (KSI) | −15 | −30 to −40 |
| Tensile Peak (KSI) | +25 | — |
| Incremental Range (KSI) | −15 to +25 | −5 to −40 |

The results showed that the Experimental sample ($L_h/L_r<1$) exhibited a preferred residual surface stress distribution characterized by increasing principal residual compressive stresses on the surface of the CBN compact layer as the predefined thickness W of the carbide support layer was incrementally shortened from about 0.1-inch (2.54 mm) to about 0.02-inch (0.508 mm) as measured from the interface with the CBN layer. In contrast, the Control sample exhibited a residual stress distribution characterized by an increasing residual surface tensile stress in the CBN compact layer as the predefined thickness W of the carbide support layer was incrementally shortened from about 0.1-inch (2.54 mm) to about 0.02-inch (0.508 mm) as measured from the interface with the CBN layer.

From the foregoing comparison of Example 2, the preferred residual surface stress distribution of the present invention thus is suggested as characterized by increasing principal residual compressive stresses on the surface of the compact layer as portions of a predefined thickness, W, of the carbide support layer are incrementally removed. Such distribution comports with bowing observations and profilometer measurements which indicate a concave profile for the blanks of the present invention as compared to a convex profile for conventional blanks upon the incremental removal of the carbide support layer. As described, for example, in U.S. Pat. No. 4,797,326, a compressive loading in the compact layer is preferred as contributing to the physical attachment of the compact layer to the support layer. It is speculated, however, that this compressive loading, which is maintained and predominates in the compacts of the present invention additionally contributes to the improvement in the physical properties of the laminate which have been experimentally observed. Thus, the characterization described herein may be used both to validate the precepts of the invention and as a criterion for effectuating those precepts by methods other those described herein.

For example, and as shown in Example 1, the residual compressive stress distribution pattern of the present invention is manifested as an increase in the shear stress of the laminate. However, as it is known that the compression of the compact layer improves the overall physical properties of the blank, it will be appreciated that the supported compacts of the invention additionally will exhibit correspondingly less microfracture which advantageously affects the fracture toughness and abrasion resistance of the material. Accordingly, when employed in grinding applications and the like, the inventive blanks have been observed to desirably produce smaller chips than conventional blanks.

As to additional advantages of the supported compact blanks exhibiting the residual stress distribution of the present invention, it will be appreciated that such blanks, having relatively higher residual compressive surface stresses in the compact layer, may be manufactured or machined to have a thinner support layer than was heretofore possible. As is shown from a comparison of FIGS. 5 and 6, support layers as thin as from about 0.06-inch (1.5 mm) to about 0.02-inch (0.5 mm) may be employed with the compact layer still being maintained in compression. Thinner blanks therefore may be manufactured to economize material costs. Alternatively, where product considerations now dictate a relatively thin blank, the blanks of the present invention may be substituted to result in an improvement in such performance properties as fracture toughness, abrasion resistance, and shear strength.

The relatively higher residual compressive surface stresses in the compact layer of the supported compacts of the present invention additionally facilitates the cutting of the blank into a number of constituent pieces. That is, it is a common manufacturing expedient for several smaller blanks to be cut from a single larger, e.g., 50 mm, blank. However, for a cylindrically-shaped blank, it is known that the outer periphery thereof generally is unusable and must be considered waste as being less in compression than the center of the blank. As the blanks of the present invention have a relatively higher residual compressive stress, it will be appreciated that the outer peripheries thereof will be usable such that additional pieces may be cut therefrom without compromising the integrity of the material.

Further as to the advantages of the supported compact blanks exhibiting the residual stress distribution of the present invention, it has been observed that such blanks will exhibit more temperature resistance and therefore have higher service temperatures than conventional blanks. In this regard, it is known that supported compacts are susceptible to thermally-induced stresses as a result of the difference in thermal expansion coefficients as between the compact and the support layers. In tool insert applications and the like, these thermal stresses are developed from the heat-generating effects of cutting, grinding, and other machining operations. When a high enough temperature is reached, the compressive loading of the abrasive layer may decrease to a point where the layer delaminates from its support. However, as having higher compressive loadings than the blanks heretofore available, the supported compacts of the present invention will have correspondingly higher service temperatures and a correspondingly broader spectrum of applications.

EXAMPLE 3

Additional experiments were conducted to illustrate a capability of the present invention for tailoring the physical properties of a supported compact by effecting a non-isobaric pressure distribution thereacross during its cooling. Supported compact samples having a diameter of 50 mm again were prepared using a crystalline CBN feedstock having an average particle size distribution of 2 microns, and a tungsten carbide-cobalt support comprising about 10–16% cobalt by weight. Samples of the supported feedstock were charged within the reaction cell of a conventional HT/HP apparatus; which cell was provided to contained a pressuring transmitting medium of a powdered NaCl salt which was interposed between the axial and radial extents of the cell and the axial and radial surfaces of the samples at varying ratios of $L_h/L_r$ as defined hereinbefore. If necessary, a powder graphite filler was interposed between the pressure transmitting medium and/or the surfaces of the charge, and the axial extents of the cell.

The samples prepared as described were processed at conventional HT/HP conditions including a temperature of about 1300° to 1600° C. and a pressure of about 50–60 kbars which were applied for about 60 minutes. A cool down cycled followed wherein the cooling rate was controlled to about 10°–20° C./see and the pressure was relieved at a rate of about 10 kbar/min. The generally cylindrical supported blanks recovered again were about 50 mm in diameter, and had an overall thickness of about 3.2 mm with a CBN layer thickness of about 0.5 to 0.8 mm and a carbide support layer thickness of about 2.4 to 2.7 ram. Table 3 summarizes the $L_hL_r$ ratios of the samples prepared.

TABLE 3

| Axial ($L_h$) to Radial ($L_r$) Pressure Transmitting Medium Thickness Ratio | |
|---|---|
| Sample No. | $L_h/L_r$ |
| Control | 15/1 |
| Experimental 1 | 0/1 |
| Experimental 2 | 1/2 |

The samples summarized in Table 3 were characterized in terms of the principal residual stresses on the surface of the CBN layer. In this regard, a strain gauge (Measurements Group, Inc., triple rectangular stacked rosette, WA-03-03WR-120 gauges) was centered on the top or outer axial surface of the CBN layer of selected samples, and the carbide layers of the samples were machined to a normalized thickness, W, of about 0.1-inch (2.54 mm) as measured from the interface with the CBN layer. Principle orthogonal stress readings, $S_p$ and $S_q$, were obtained as increments of the carbide layers were removed down to a minimum thickness of 0.051 mm (0.002-inch) to affect the residual surface stress of the blank. The results for the Experimental 2 sample are presented graphically in FIG. 7 as a plot of the residual surface stress in the CBN layer versus carbide layer thickness.

Figure 5:
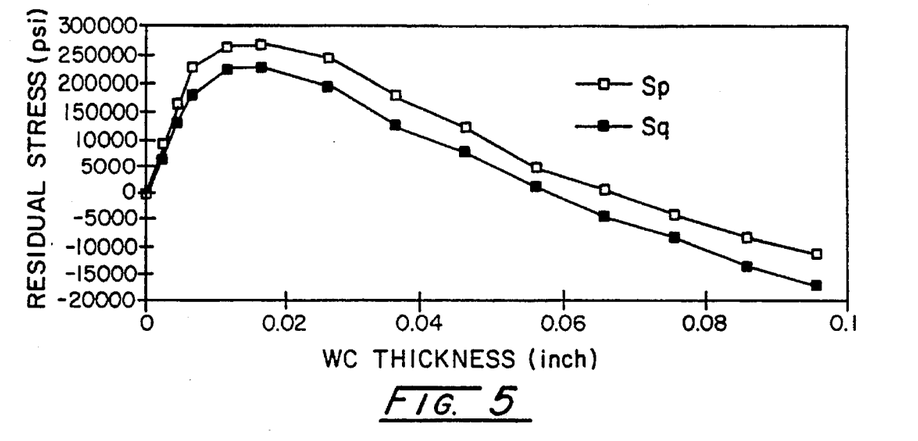
FIG. 5 is a graphical representation of the principal residual stresses on the surface of the CBN layer as a function of carbide layer thickness for a representative supported compact sample processed according to the prior an under an $L_h/L_r$ ratio of 15/1.
Figure 6:
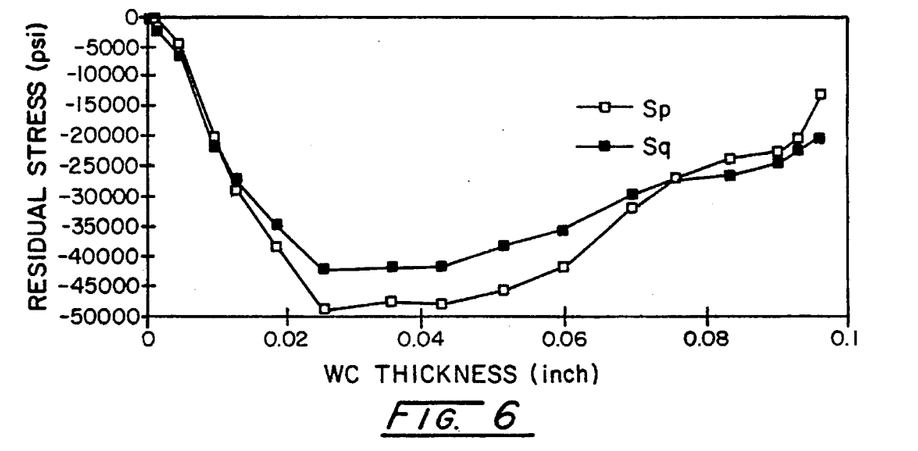
FIG. 6 is a graphical representation of the principal residual stresses on the surface of the CBN layer as a function of carbide layer thickness for a representative supported compact sample processed according to the present invention under an $L_h/L_r$ ratio of 0/1.
Figure 7:
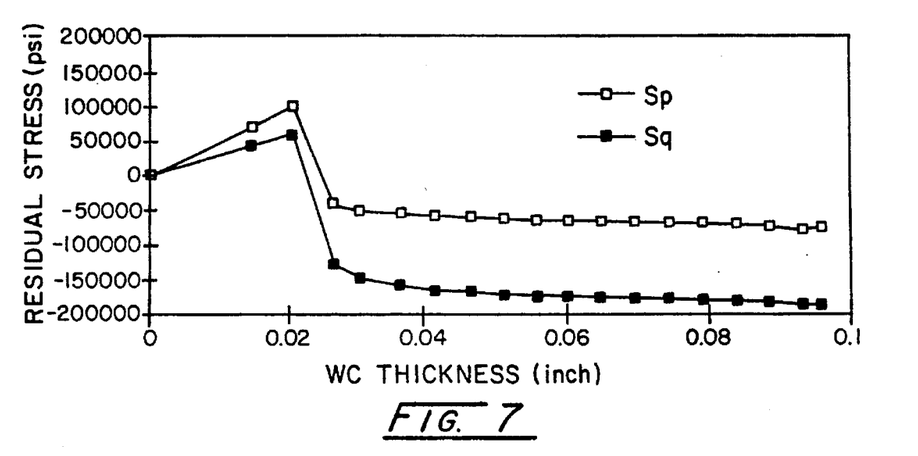
FIG. 7 is a graphical representation of the principal residual stresses on the surface of the CBN layer as a function of carbide layer thickness for a representative supported compact sample processed according to the present invention under an $L_h/L_r$ ratio of 1/2.

Comparing FIGS. 5, 6, and 7, the results again show that the Experimental samples (FIGS. 6 and 7) prepared according to the present invention ($L_h/L_r<1$) exhibited the preferred residual surface stress distribution characterized by increasing or essentially constant residual compressive stresses on the surface of the CBN compact layer as the predefined thickness W of the carbide support layer was incrementally shortened from about 0.1-inch (2.54 mm) to about 0.002-inch (0.051 mm) as measured from the interface with the CBN layer. As aforementioned in connection with Example 2, the Control sample (FIG. 5), which was conventionally prepared ($L_h/L_r \geq 1$), in contrast exhibited a residual stress distribution characterized by an increasing residual surface tensile stress in the CBN compact layer as the predefined thickness W of the carbide support layer was incrementally shortened from about 0.1-inch (2.54 mm) to about 0.02-inch (0.508 mm) as measured from the interface with the CBN layer.

The Experimental 2 sample (FIG. 7), however, which was prepared as having an $L_h/L_r$ ratio of about 0.5, exhibited a residual surface stress distribution which may be characterized as intermediate that of the Control and the Experimental 1 samples. That is, the distribution is characterized by essentially constant residual compressive stresses on the surface of the CBN compact layer as the predefined thickness W of the carbide support layer was incrementally shortened from about 0.1-inch (2.54 mm) to about 0.02-inch (0.508 mm) as measured from the interface with the CBN layer. The foregoing therefore suggests an additional precept of the present invention which is the tailoring of the physical properties of a supported compact by effecting a non-isobaric pressure distribution thereacross during its cooling.

EXAMPLE 4

Figure 8:
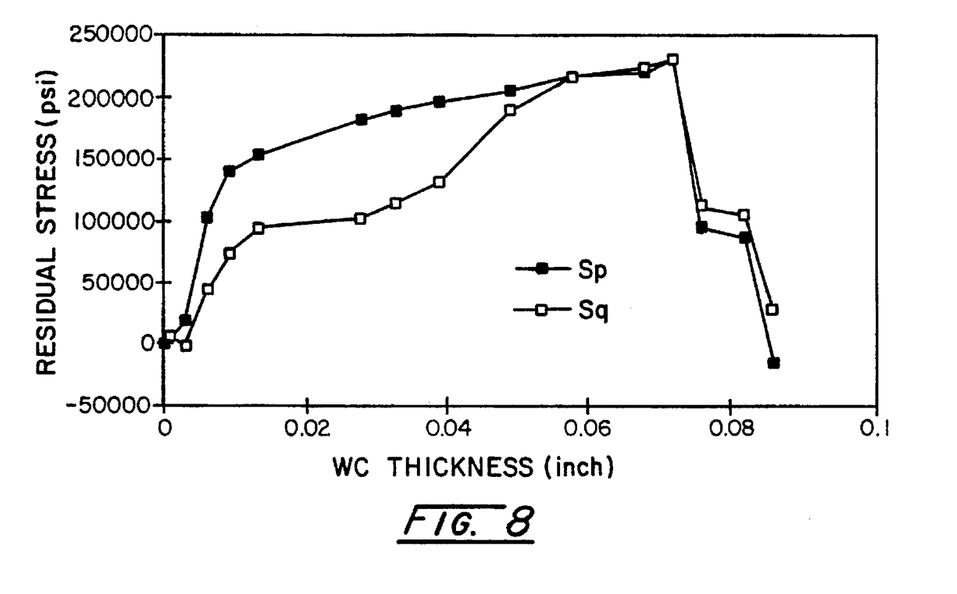
FIG. 8 is a graphical representation of the principal residual stresses on the surface of the CBN layer as a function of carbide layer thickness for a representative CBN-TiN supported compact sample processed according to the prior art under an $L_h/L_r$ ratio of 15/1.
Figure 9:
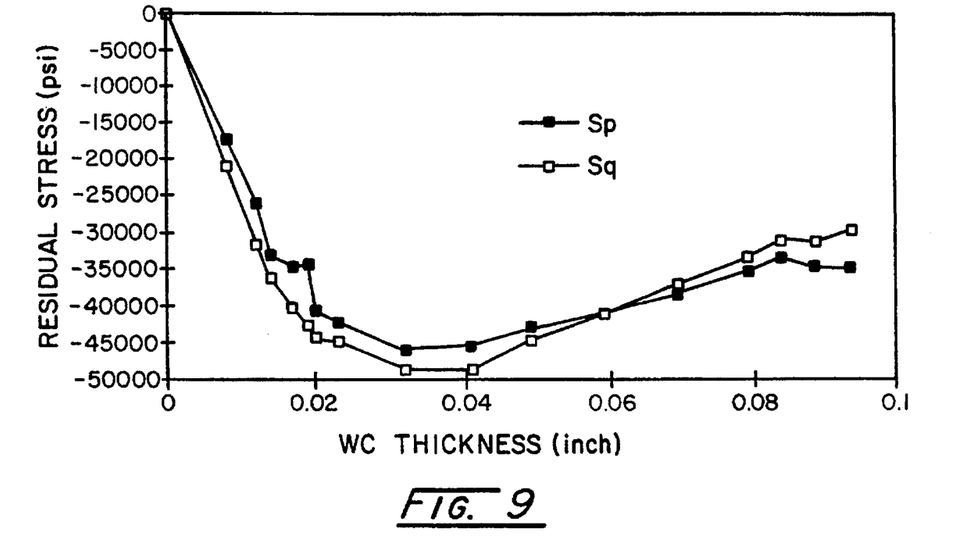
FIG. 9 is a graphical representation of the principal residual stresses on the surface of the CBN layer as a function of carbide layer thickness for a representative CBN-TiN supported compact sample processed according to the present invention under an $L_h/L_r$ ratio of 0/1.

The applicability of the present invention to supported compact having abrasive layers of varying compositions was demonstrated. Supported compact samples were prepared as is described in Examples 1 and 2 (Control $L_h/L_r=15/1$, Experimental $L_h/L_r=0/1$), except that the compact layers were provided as composite or conjoint compacts comprising a polycrystalline mass of CBN particles and a second phase of a titanium nitride binder. Looking to FIGS. 8 and 9, the results again show that the Experimental sample (FIG. 9) prepared according to the present invention ($L_h/L_r<1$) exhibited the preferred residual surface stress distribution characterized by increasing or essentially constant residual compressive stresses on the surface of the CBN compact layer as the predefined thickness W of the carbide support layer was incrementally shortened from about 0.1-inch (2.54 mm) to about 0.002-inch (0.051 mm) as measured from the interface with the CBN layer. The Control sample (FIG. 8), which was conventionally prepared ($L_h/L_r \geq 1$), in contrast exhibited a residual stress distribution characterized by increasing residual tensile stresses on the surface of the CBN compact layer as the predefined thickness W of the carbide support layer was incrementally shortened from about 0.1-inch (2.54 mm) to about 0.02-inch (0.508 mm) as measured from the interface with the CBN layer. Thus, it is suggested that the precepts of the present invention are validated irrespective of the composition of the compact or support layers.

It is anticipated that certain changes may be made in the foregoing methods and products without departing from the scope of the invention herein involved. In this regard, it will be appreciated that, based upon the characterization of the preferred residual surface stress distribution herein provided, other methodologies for effecting such a distribution will become obvious. Such methodologies would include, for example, imposing an axial and/or radial temperature gradient across the blank, or by otherwise providing for a non-isothermal cooling of the blank from the HT/HP conditions of its processing. Other methodologies might involve interposing an intermediate layer between the compact and the support layers, the intermediate layer selected as having a significantly different coefficient of thermal expansion than either the abrasive or carbide layer, or the varying of the coefficient of thermal expansion across the carbide and/or the abrasive layer. Accordingly, it is intended that all matter contained in the foregoing description of the present invention or shown in the accompanying drawings shall be interpreted as illustrative rather than as limiting.

What is claimed:

1. A high pressure/high temperature (HP/HT) method for making a metal carbide supported polycrystalline compact in a HT/HP apparatus, said apparatus comprising a generally cylindrical reaction cell assembly having an inner chamber of predefined axial and radial extents and containing transmitting medium layers, and a charge assembly having axial and radial surfaces and formed of at least one subassembly comprising a mass of crystalline particles adjacent a metal carbide support layer, said method comprising the steps of:

(a) disposing said charge assembly within said chamber of said reaction cell assembly;

(b) providing axial pressure transmitting medium layers between the axial surfaces of said charge assembly and the respective axial extents of said chamber to define an axial pressure transmitting medium thickness, $L_h$;

(c) providing radial pressure transmitting layers between the radial surface of said charge assembly and the radial extent of said chamber to define a radial pressure transmitting medium thickness, $L_r$, the ratio $L_h/L_r$ being less than 1; and (d) subjecting said reaction cell assembly to HT/HP conditions selected as effective to sinter said crystalline particles into a polycrystalline compact layer and to bond said polycrystalline compact layer at an interface to said metal carbide support layer for forming said metal carbide supported polycrystalline compact.

2. The method of claim 1 wherein said HT/HP conditions include a pressure of at least about 30 kbars and a temperature of at least about 1000° C.

3. The method of claim 1 wherein said mass of crystalline particles comprises diamond particles.

4. The method of claim 1 wherein said mass of crystalline particles comprises cubic boron nitride particles.

5. The method of claim 1 wherein said metal carbide support layer comprises carbide particles selected from the group consisting of tungsten, titanium, tantalum, and molybdenum carbide particles, and mixtures thereof.

6. The method of claim 5 wherein said metal carbide support layer comprises a metal binder selected from the group consisting of cobalt, nickel, and iron, and mixtures and alloys thereof.

7. The method of claim 1 wherein the ratio $L_h/L_r$ is from about 0 to about 0.5.

8. The method of claim 1 wherein said pressure transmitting medium is formed of a salt.

9. The method of claim 8 wherein said salt is selected from the group consisting of chlorides, iodides, and bromides of sodium, potassium, and calcium, and mixtures thereof.

10. The method of claim 1 wherein a portion of predefined thickness W of said support layer is removed from said supported polycrystalline compact, said predefined thickness being from about 0.02 inch (0.5 mm) to about 0.1 inch (2.5 mm).

11. The method of claim 1 further comprising the step of filling untilled portions of said chamber with a non-pressure transmitting medium.

12. The method of claim 11 wherein said non-pressure transmitting medium is formed of a material selected from the group consisting of ceramics, metals, and graphite.

13. The method of claim 1 wherein said reaction cell assembly comprises at least two sub-assemblies axially-aligned in said chamber and which further comprises the step before step (d) of interposing axial pressure transmitting medium layers between said sub-assemblies, said axial pressure transmitting medium thickness $L_h$ being defined as the summation of the thicknesses of the axial pressure transmitting medium layers provided between the axial surfaces of said charge assembly and the axial extents of said chamber, and the axial pressure transmitting medium layers interposed between said sub-assemblies.

14. The metal carbide supported polycrystalline compact formed by the method of claim 1 or 11, said supported polycrystalline compact characterized as exhibiting essentially constant or increasing principal residual compressive stresses on the surface of said compact layer as portions of a predefined thickness, W, of said support layer measured from said surface are incrementally removed from said composite compact.

15. The supported polycrystalline compact of claim 14 wherein said polycrystalline compact layer bonded to said metal carbide support layer comprises diamond.

16. The supported polycrystalline compact of claim 14 wherein said polycrystalline compact layer bonded to said metal carbide support layer comprises cubic boron nitride.

17. The supported polycrystalline compact of claim 14 wherein said metal carbide support layer supporting said polycrystalline compact comprises carbide particles selected from the group consisting of tungsten, titanium, tantalum, and molybdenum carbide particles, and mixtures thereof.

18. The supported polycrystalline compact of claim 17 wherein said metal carbide support layer supporting said polycrystalline compact comprises a metal binder selected from the group consisting of cobalt, nickel, and iron, and mixtures and alloys thereof.

* * * * *